Dec. 18, 1962    R. M. DECKER ETAL    3,069,554
AUTOMATIC TO MANUAL SWITCHING SYSTEM FOR CONTROLLER
Filed Feb. 1, 1960    2 Sheets-Sheet 1

INVENTORS
ROBERT M. DECKER
NATHANIEL B. NICHOLS
BY P. J. Young, Jr.

United States Patent Office 3,069,554
Patented Dec. 18, 1962

3,069,554
AUTOMATIC TO MANUAL SWITCHING
SYSTEM FOR CONTROLLER
Robert M. Decker and Nathaniel B. Nichols, Rochester, N.Y., assignors to Taylor Instrument Companies, Rochester, N.Y., a corporation of New York
Filed Feb. 1, 1960, Ser. No. 5,856
8 Claims. (Cl. 307—64)

This application relates to automatic controllers of the class disclosed in the pending application for United States Letters Patent of Nathaniel B. Nichols, S.N. 840,157, filed September 15, 1959 and assigned to the assignee of the present application.

The main concern of the aforesaid pending application of Nichols is the response characteristics of the controller disclosed therein as regards automatic control of a process by said controller. In particular, the Nichols controller is designed so that control of many processes can be carried out automatically by it from beginning to end of process activity, including process start-up.

Nevertheless, in practice, the general rule is to provide for removing the controller, physically and/or functionally from the control system. The controller may have to be replaced, it may have to be inactivated for maintenance or repair in situ, or it may have to stand by functionally isolated from affecting the process while for one reason or another a human operator inserts himself into the control loop, so to speak, and by some manual activity directly or indirectly controls the operation of the process.

Such operations as these require that the control loop be disturbed, in this case by making and breaking various electrical circuits interconnecting the controller and other elements of the control system. Thus, the electrical output signal of the controller may be disconnected from the final control element in which case it is then necessary to provide the final control element with an electrical signal that looks like the said output signal to the control element. Otherwise, the final control element would take the disappearance of the controller's output signal as a command to exercise a control effect on the process that may be far different from what the controller last called for, and as a result the process may suffer a drastic "bump," i.e., a change in the process variable caused by a change in control effect due to connecting or disconnecting the controller in or from the control loop.

The foregoing and other related controller connecting problems are well understood in the art and, hence, it is the practice to design switching circuitry that is supposed to permit carrying out making and breaking of the control loop for purposes such as set out supra, without "bumping" the process.

According to our invention we have designed a novel and unobvious switching system that permits bumplessly switching the Nichols controller or a controller of the same type, namely, a high-gain D.C amplifier having input and feedback circuitry so designed that the one input terminal of the amplifier remains at zero potential relative to its other input terminal when the latter is kept at some fixed reference potential.

As in the prior art, our novel switching system provides two basic control system conditions, states or configurations: one in which the controller, in response to an error signal, i.e., the difference between a signal characterizing the state of the process variable being controlled and a signal characterizing the state in which the process variable is desired to be, operates a valve or other final control element in a manner such as to cause the first said signal to assume or tend to assume a predetermined relation to the second signal. The first said signal may be termed the "process variable" and the instrumentality producing it, a "process transmitter." The second signal may be referred to as "set point" and the instrumentality furnishing it a "set point source." Finally, the control system state thus defined may be called "automatic."

The other basic control system state is one in which the final control element is connected to a manually adjustable source of final control element operating signal of the same nature as the output signal of the controller. The said source may be termed a "manual source."

It is often the practice to make the set point source serve also as the manual source. In this case, a third state of the control system is necessary. In this third state, termed "seal," neither controller nor set point source act on the final control element. Instead, in this state the control system is being prepared for transfer of the control system between automatic and manual while the valve or other final control element is "locked," "sealed" or otherwise caused to maintain a fixed effect on the process independently of the controller, which effect is that which the said final control element exerted on the process at the moment the control system was caused to leave one of the other states and assume the seal state.

The seal state must, of course, be provided for by switching means or equivalent in addition to that required for transfer of the control system between manual and automatic states, and involves undesirable structural and operation complications which are not essential in themselves to the purpose of automatic and manual control.

We eliminate the seal state by providing a manual source which is independent of and in addition to the set point source, and according to the invention, provide means for causing the output signal of the controller to automatically match the manual control signal from the manual source while the control system is in the manual state. While at first sight, and insofar as structural complication is concerned, this may seem to amount to merely trading one structural complication for another, that is not the case. Where the set point source is used as the manual source, the complications of the necessary seal state are compounded by being interwoven with manual and automatic states, due to the fact that one and the same unit must serve as both setpoint and manual source.

On the other hand, providing a separate manual source not only eliminates the seal state, but also has the desirable feature of not being interwoven with the remainder of the control system. For example, while removing the set point source from a control system of the sealing type entirely prevents the remainder of the system from exercising any control effect, save the fixed one of "seal," in the non-sealing system just described manual control remains possible even though the set point source be removed.

Turning now to the drawings for a more detailed understanding of our novel controller switching system and the inventive features thereof:

Figure 3:
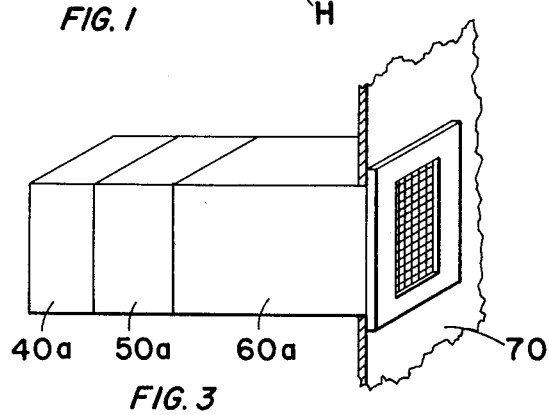
Figure 4:
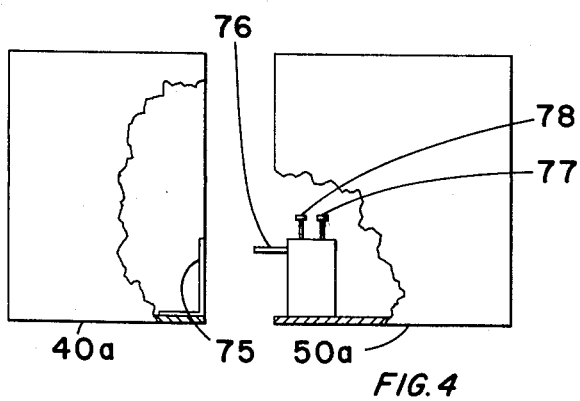
Figure 2:
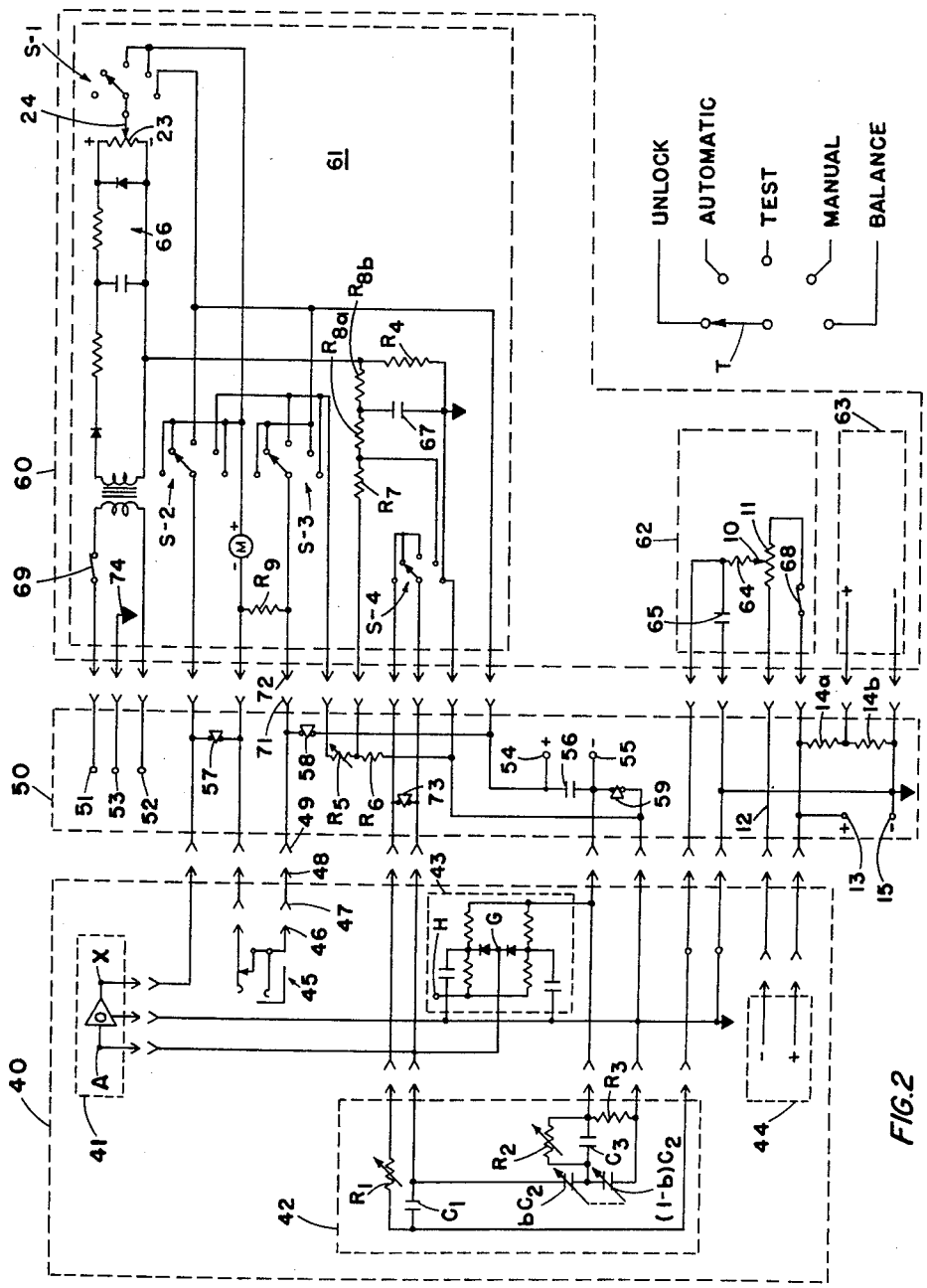
FIGURE 2 is a schematic showing of a control system, such as described above including our novel switching circuitry for switching the controller between automatic and manual and, as well, to and from several ancillary states found convenient in practice.

FIGURE 3 indicates briefly one form the system of FIGURE 2 may take as regards external form and mounting, and FIGURE 4 shows briefly a mechanical detail of a switching feature of the circuit shown in FIGURE 2.

Figure 1:
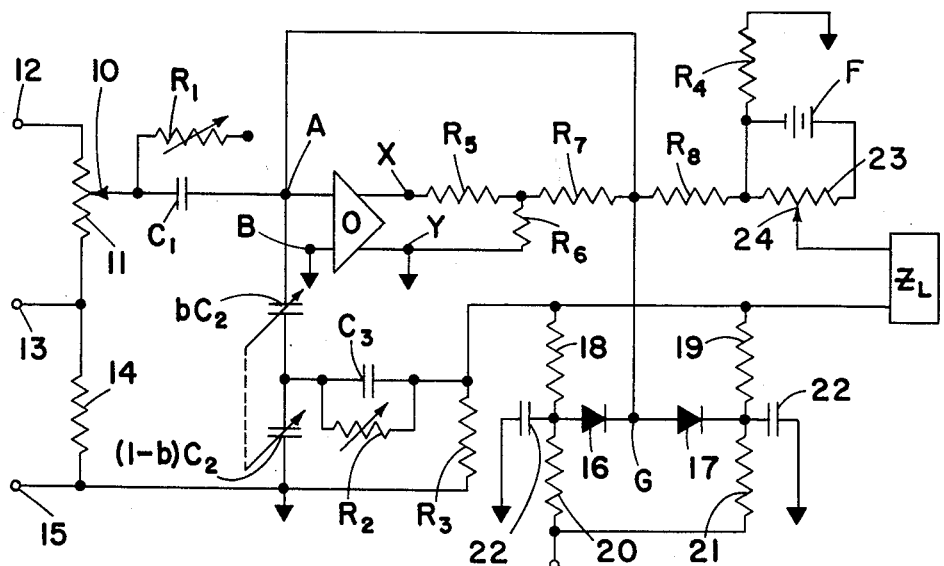
FIGURE 1 is a schematic showing of a control system such as described above in the manual state according to our invention.

The controller circuitry shown in FIGURE 1, herein, is identical to that shown in the aforesaid Nichols application except in respect of that which we are about to describe, and the reference characters referred to herein identify the same elements identified by like reference characters in the aforesaid Nichols application.

The circuit configuration of FIGURE 1 of the earlier application is that providing automatic control of a control valve or the like, represented by load $Z_L$, whereas in the present application, the load $Z_L$ is driven by a manually adjusted source of current herein shown as a battery F with a resistor 23 across its terminals, said resistor 23 having a movable tap 24 connected to $Z_L$, and the negative end of the resistor 23 being connected to circuit common via a resistor $R_4$. The manual load circuit therefore consists of, in series in the order named, $R_4$, a portion of resistor 23, $Z_L$ and $R_3$.

Whereas in automatic, terminal X of amplifier O is connected to $Z_L$, in manual, terminal X is connected to circuit common via a pair of series-connected resistors $R_5$ and $R_6$, one terinal of $R_5$ being connected to amplifier terminal X and one terminal of $R_6$ being connected to circuit common. A further pair of series-connected resistors $R_7$ and $R_8$ each have a terminal connected to input terminal A of amplifier O, $R_7$ also having a terminal connected to the junction of $R_5$ and $R_6$, and $R_8$ also having a terminal connected to the junction of resistor 23 and the negative side of battery F. Finally, resistor $R_1$ is disconnected from the circuit, as by disconnecting one terminal thereof from connection with terminal A.

With the circuit changes and additions described above, the automatic control circuit configuration described in the aforesaid Nichols application is transformed to a circuit configuration in which control can be exerted otherwise than by the output of amplifier O. Thus, a human operative may move tap 24 to a given position and cause the load $Z_L$ to exert a control effect on the process corresponding to the said given position.

A comparison of FIGURE 1 of the aforesaid Nichols application with FIGURE 1 of the present application will show that the problem of transforming the former configuration into the latter is essentially a matter of setting tap 24 so that when the load $Z_L$ is disconnected from terminal X of amplifier O and connected to said tap the same current will then flow through $Z_L$ as when $Z_L$ was connected to terminal X, and the transition from automatic to manual will therefore be smooth.

Transferring back to automatic, however, is not as easy for the reason that the behavior of amplifier O is dependent on its input and feedback circuitry. Obviously, if this circuitry is changed by an automatic to manual transfer, it can only be expected that a subsequent restoration of the automatic configuration will find the controller output and the state of charge of $C_1$, $bC_2$, $(1-b)C_2$, and $C_3$, other than they should be for the purpose of restoring automatic control of the process without bumping the process.

According to the present invention, we solve the problem of obtaining smooth manual to automatic control transfer by providing amplifier O with a dummy load in manual and a voltage input in manual that is a measure of the difference between controller output current through the dummy load and the load current through the manual load, FIGURE 1 herein illustrating a preferred mode of applying this solution in practice.

The actual load on amplifier O in automatic control is effectively $R_3$, the resistance component of $Z_L$ and the resistance of the leads connecting $Z_L$ to the controller. As FIGURE 1 herein shows, in manual, $R_3$ is part of the manual load circuit, hence, $R_5$ may be a resistance equal to the combined resistance of $Z_L$, the said leads and $R_3$. (Later, in connection with FIGURE 2, it will be found that because of the nature of the circuitry and the changes therein caused by switching, that $R_6$ and $R_5$ together must equal the said combined resistance).

The dummy load circuit an amplifier O also includes resistor $R_6$ and the manual load circuit also includes resistor $R_4$, hence, these two resistors are chosen to be alike in value. However, $R_4$ and $R_6$ are not incorporated but for the sake of loading but for the purpose of providing a tracking error signal, i.e., an error signal indicative of the deviation, if any, between dummy load current and the manual or real load current.

While $R_4$ and $R_6$ each have a terminal directly connected to circuit common, it will be noted that whereas the other terminal of $R_4$ is biased below circuit common by the negative side of battery F, the corresponding terminal of $R_6$ will be above said other terminal of $R_4$ in potential. Therefore, if the dummy load current is the same as the manual load current, the IR drop across $R_4$ will be equal and opposite to the IR drop across $R_6$. According to the invention, therefore, we provide like resistances $R_7$ and $R_8$ to sum the mentioned IR drops at a common point, connect that point to terminal A of amplifier O and disconnect $R_1$ from terminal A. As a result, an error voltage at terminal A will appear if the amplifier O does not track the load $Z_L$.

Resistances $R_7$ and $R_8$ are chosen to be large enough (several megohms) to prevent interaction between the dummy load circuit and the manual load circuit, 10,000 ohms, or thereabouts being a typical value of load circuit resistance. It is therefore evident that, in the manual configuration of FIGURE 1 herein, as the current through $Z_L$, etc., is varied by moving tap 24, the current through the dummy load circuit will match the manual current. Hence, if the manual configuration of FIGURE 1 herein is caused to revert back to the automatic configuration of FIGURE 1 of the aforesaid Nichols application, the controller will pick up the final control element represented by $Z_L$ at exactly the point the manual current from tap 24 left off, and will operate the final control element from there on at the dictates of the error signal at tap 10 at the input of the controller. Thus, switching to automatic from manual will be bumpless, assuming that the manual control period has resulted in the process variable matching the set point. In any event, the switching activity itself will not cause a bump to occur, due to the fact that the moment automatic control returns, the current through $Z_L$ will reflect only the relation of process variable and set point, as that relation is reflected in the error signal at tap 10.

As is pointed out in the aforesaid Nichols application, the desired action of amplifier O during automatic control, depends on the potential of its terminal A being substantially zero relative to circuit common. Such is also the case insofar as is concerned the manual configuration of the control system.

In the manual case, however, the feedback to terminal represents the difference between dummy load current and manual load current; hence, a voltage from the manual circuit is taken from the connection of $Z_L$ and $R_3$ in order to maintain the controller feedback capacitance in a condition of charging such that when the transfer from manual to automatic is made, it will not be necessary for the controller output current to charge up the capacitance after the load $Z_L$ is reconnected to terminal X, and, therefore, to change its output momentarily and thus bump the process unnecessarily.

It will be seen that the terminal A of amplifier sees three possible sources of input voltage:

(1) The manual load circuit via the response circuitry, (2) The manual load circuit and the dummy load circuit via the junction of $R_7$ and $R_8$ and, (3) The error signal source represented by resistors 11 and 14. However, since the output of amplifier O is inverted, input voltage from source (2) opposes input voltage from sources (1) and (3). Moreover, because of the particular potential relations of $R_4$ and $R_6$ with respect to circuit common, the input voltage of source (2) is opposed in sense to the difference between dummy load current and manual load current. Therefore, terminal A is forced to remain at a potential that differs insubstantially from that of circuit common, dummy load current matches manual load current, and the feedback capacitance around amplifier O is charged to the proper condition by the manual load current.

While in manual the error signal into $R_1$ and $C_1$ from tap 10 is of no concern, it is nevertheless desirable to keep the time constant low at the error signal output to terminal A. Since with $R_1$ in circuit it is possible to have time constants of seconds or even minutes depending on the setting of $R_1$, in manual position $R_1$ is disconnected so that the time constant in question is determined by $C_1$ and the resistance of the source of error signal. Resistors 11 and 14 are much smaller than usual values of $R_1$, hence, it is easy to keep the error signal input time constant to values of a few tenths of a second even with a rather large capacitor $C_1$.

It is to be noted that since in manual input voltage sources (1) and (3), as defined above, are capacitively coupled to terminal A, their effects on the potential of terminal A of amplifier O are nil except in cases of changes in manual load current and error signal, respectively.

Battery F and resistance 23 will be arranged to provide a manual load current of the same range as the output current of amplifier O. Hence, in a manual current range of (1–5) ma., say, the diode circuit including diodes 16 and 17, etc., as in the automatic case (see the aforesaid Nichols application) does not exist, functionally speaking.

While we believe the foregoing would suffice to enable one skilled in the art to practice our invention in the ordinary routine of his art, it is also true that in practice manual and automatic control system configurations involve a considerably greater complexity of hardware than FIGURE 1 indicates. Accordingly, in FIGURE 2 we illustrate a complete switching system for providing, not only the basic manual and automatic configurations of the control system, but also certain ancillary configurations, and an arrangement of elements found convenient in practice for various reasons.

In FIGURE 2, our novel controller circuit is shown as consisting of three main units: a rear section 40, a center section 50 and a front section 60, each such section being shown in dotted outline enclosing the various entities making up each section.

Section 40 includes an amplifier section 41, including amplifier O; a response section 42, including $R_1$, $C_1$, and the other circuit elements that, as described previously, give amplifier O its proportional, reset and rate properties; and a limiter section 43, the purpose of which has been fully set forth in the aforesaid Nichols application.

Since the contents of sections 41, 42 and 43 have been discussed previously in this application and in the aforesaid Nichols application, the showing thereof has been abbreviated. For example, input terminal B of amplifier O and most of the reference characters applied to the elements of limiter section 43 have been omitted in FIGURE 2. However, in addition to the familiar elements of sections 41, 42 and 43, section 40 also includes a D.C. supply section 44, used to convert mains A.C. to a D.C. voltage for the set point source of the controller, and a test jack 45, to be further described infra.

Center section 50 includes terminals 51, 52 and 53, the former pair of terminals being A.C. connections to the mains to supply D.C. power packs such as D.C. supply section 44, the D.C. power pack (not shown) for amplifier O, and so on, and in general serves as the ultimate source of power both A.C. and D.C., for various entities, too numerous to mention, that one may expect to find in a commercial controller combination. Terminal 53 provides for an external ground connection.

Center section 50 also includes terminals 54 and 55 for connection to the load $Z_L$ (not shown) externally of center section 50, terminals 12, 13 and 15 or their equivalent, as well as resistor 14 (actually in the form of two resistors 14a and 14b) $R_5$, $R_6$, and a capacitor 56 bridged across terminals 54 and 55 to bypass A.C. away from the load impedance $Z_L$. Four push button switches 57, 58, 73 and 59 are also included in center section 50 for a purpose to be explained infra.

Front section 60 includes an "auto-manual" unit 61, a set point source or unit 62 and a recording unit 63. Recording unit 63, which may include alternately or simultaneously include indicator means, alarm means and the like, is intended to be bridged across resistor 14b in order to receive an input corresponding to the process variable for exhibiting the value of the same in the form of a scale indication and/or a recording.

A manual source 66, intended to be connected to the A.C. at terminals 51 and 52 in section 50, including resistor 23, and constructed and arranged to convert the said A.C. to D.C. voltage across resistance 23 instead of the battery F, is provided in section 61. Since manual source 66 may vary considerably in actual construction, it will not be described in detail save to note that it may be made up of conventional A.C. transformer means, rectifying and filtering elements or the like, as will be understood by those skilled in the art.

Auto-manual unit 61 also includes a load-current indicating meter M, and a resistance $R_9$ connected between the minus side of meter M and the movable tap of a switch S–3 for the purposes to be explained later.

For switching purposes unit 61 includes four switches S–1, S–2, S–3 and S–4, each switch having five contacts and a movable tap manually settable to any one of such contacts.

Finally, $R_7$, $R_8$ (actually in the form of two separate resistors $R_{8a}$ and $R_{8b}$) and $R_4$ are included in unit 61, a capacitor 67 being provided to form a bypass around $R_{8b}$ and $R_4$ in series for shunting stray A.C. to circuit common.

The above described unit-arrangement is the basis of a plug-in type of construction offering optimum operational flexibility and ease of use, maintenance and construction of a practical controller-combination of the type disclosed. In this case, units 41, 42 and 43 are designed to be plugged into unit 40, which latter may then be thought of as including some sort of casing and support structure having limiter unit 43 as a more or less fixed part thereof and units 41 and 42 as easily-replaceable parts thereof.

Likewise, front section 60 may be thought of as some sort of housing and support having sections 61, 62 and 63 as easily-replaceable parts thereof.

Finally, since the elements of circuitry in sections 40 and 60 require electrical interconnection and, as well, external connections to a source of power, a source of process variable signal and to the load $Z_L$, section 50 is provided, having as its major function the task of providing such interconnection and such connections. Hence, we design the sections 40, 50 and 60 so that they plug together to form a unitary structure, suitably provided in the form of the usual "miniature" recorder-controller designed for mounting in a panel or otherwise, such as indicated in FIGURE 3, herein, wherein housing structures 40a, 50a, 60a are shown mounted in a panel 70, and correspond, respectively to the dotted outlines of sections 40, 50 and 60, FIGURE 2, in that the said housing structures would contain therein the various elements shown in FIGURE 2 as enclosed by sections 40, 50 and 60.

Since plug-in construction is well known, we do not deem it necessary to illustrate any particular one of the many types of plug and socket devices that would be suitable for use in the scheme indicated by the sectional divisions of FIGURE 2. Moreover, in order to avoid confusing FIGURE 2, in general, no reference numerals have been applied to the individual plug and socket connecting elements since these are readily identified by their showing and orientation. For example, shorting-type jack 45 may be an element more or less permanently attached to response unit 42 and having two plugs for insertion in a pair of sockets more or less permanently attached to section 40. Hence, the arrow-head 46 represents one of said plugs and arrow-tail 47 represents one of said sockets. Socket 47, in turn is connected electrically to a plug 48 and center section 50 has a socket 49 for receiving plug 48. Again, socket 49 is connected to a socket 71 for receiving plug 72 of section 60, which last plug connects electrically to the movable tap of switch S-3, and to $R_9$.

The push button switches 57, 58, 59 and 73 are so constructed and arranged that when sections 40, 50 and 60 are physically assembled together, in the manner indicated by FIGURE 3, they are automatically in open condition, whereas if the sections are physically disassembled they are automatically in closed condition.

Assuming then that section 41, 42 and 44 are plugged in in section 40, sections 61, 62 (with switch 68 closed) and 63 are plugged in in section 60, and sections 40, 50 and 60 are plugged in to each other as described, and that terminals 54 and 55 are connected to the final control element (not shown), terminals 13 and 15 are connected to a process variable transmitter (not shown) and terminals 51 and 52 are connected to a suitable A.C. source, then as shown, the circuit of FIGURE 2 is in its automatic state, according to the switching legend at the lower right of FIGURE 2, wherein the movable switch tap is denoted by the reference numeral T and, in the case of each switch, reading clockwise and beginning at the uppermost contact the switch positions are given as, in the order named, unlock, automatic, test, manual and balance. For convenience, circuit common, which may or may not be "ground," is not shown save by an occasional inverted triangle, such as that shown at 74, used wherever it seems useful to call attention to the existence of circuit common. It will be understood, however, that in practice plug-in connections will be provided, in addition to those illustrated, for the purpose of linking up the various elements of the assembled circuit to a circuit common, wherever circuit common is required by the circuitry.

If, following FIGURE 2, the controller input circuit is traced from terminal 15 to terminal A, it will be seen that although the elements of the circuit are located in sections 50 and 60 as well as in section 40, the input circuit is identical to that of FIGURE 1, except for the addition of switch S-4. However, if the output and feedback circuitry of the controller be traced, it will be noted that switches S-2 and S-3 and meter M have been added as essential elements of the automatic circuit.

Since it is at times necessary to disconnect manual unit 61 in order to service it, or the like, push button switches 57, 58 and 73 are arranged to close when unit 61 is unplugged, whence it will be seen that the load current connection from terminal X will pass through switch 57, shorting jack 45, and switch 58 to terminal 54, and thence via $Z_L$ to circuit common, as before, and the input circuit connection including switch S-4 will be replaced by switch 73. Thus, while unplugging unit 61 will interrupt various signal paths in the controller circuit, these paths are restored by connecting elements in center section 50, hence automatic control is unaffected by disconnection of manual unit 61.

If the movable taps of switches S-1, S-2, S-3 and S-4 are moved to their "test" contacts, it will be seen that while the input circuitry of the controller is not disturbed (since the test contact of S-4 is connected to its automatic contact), the output current from amplifier terminal X is bypassed around switch S-3 directly to load terminal 54. However, with switch 69 in the manual supply closed at this point, meter M is in series with $R_5$, $R_6$ and $R_4$, in series with that portion of resistance tapped-off between tap 24 and the minus end of resistance 23.

In setting up the control system, $R_5$ is adjusted so that it and $R_6$ in series have the same value as the resistance between amplifier terminal X and circuit common when $R_3$, the load $Z_L$ and the leads to $Z_L$ are in series across terminal X and circuit common. Therefore, if the reading of meter M is noted just before switching from automatic to test, tap 24 can be adjusted so that in test the current in the meter circuit is the same as the load current in auto. When this adjustment is performed the taps of switches S-1, S-2, S-3 and S-4 can be set in the manual position.

In manual meter M is connected to tap 24 of manual supply 66 by switch S-1, and to terminal 54 of the load $Z_L$ by way of jack 45 and switch S-3. Terminal 55 of the load $Z_L$, however, now connects to the negative side of manual supply 66 via $R_3$ and $R_4$, whereas $R_5$ and $R_6$ are disconnected from the meter circuit, and connected across the output of amplifier O.

Recalling that the resistance $R_5$ and $R_6$ in series is the same as that of $R_3$, $Z_L$ and the leads of $Z_L$ in series, it is obvious that the current through $Z_L$ in manual is the same as the current in the meter circuit in test. Accordingly, if it is assumed that the process variable does not change in the few seconds of time involved in noting meter reading in automatic, switching to test and adjusting tap 24 to get the same meter reading, and then switching to manual, it is obvious that the current through $Z_L$ will not change. Therefore, manual control of the load $Z_L$ will begin at exactly the same point as that at which automatic control was interrupted. In terms of a typical final control element such as a fluid flow control valve, no change in the controlled flow will occur due to the transfer from automatic to manual.

Switches S-2 and S-4, in their manual position, connect $R_5$ and $R_6$ in series across terminal X of amplifier O and circuit common and connect the junction of $R_7$ and $R_{8a}$ to terminal A of amplifier O. It will now be seen that in manual, the circuit of FIGURE 2 is electrically identical to that of FIGURE 1, herein. Hence, as explained in describing said FIGURE 1, supra, the controller output current through $R_5$ and $R_6$ is caused to be the same as the manual current through $R_3$, $Z_L$ and its leads. Therefore, to return to automatic control the taps of switches S-1, S-2, S-3 and S-4 need only be set in their automatic positions, and the controller will pick up automatic control of load $Z_L$, exactly where the current from the manual supply 66 left off.

The system layout of FIGURE 2 has a number of advantageous features. As noted before, auto-manual unit 61 may be removed during automatic control without disturbing control. Likewise, rear section 40 may be removed during manual control without disturbing control. This latter feature is obtained by providing resistor $R_9$ in section 60, $R_9$ being chosen to be equal to $R_3$, and push button switch 59 in section 50. Normally, when sections 40, 50 and 60 are plugged together, $R_9$ is shorted out by jack 45, and switch 59 is held open as a mechanical consequence of plugging section 40 into section 50.

If the taps of switches S-1, S-2, S-3 and S-4, however, are turned to manual and section 40 is removed, $R_9$ will become an effective connection between meter M and the tap of switch S-3, while switch 59 will close and connect terminal 55 to the negative side of the manual supply 66 via $R_4$. Since the meter connection via S-1 to the tap 24 of supply 66 is not disturbed, the manual load circuit remains the same as before, except that now $R_9$ is substituted for $R_3$ and the manual load current path is entirely provided for in sections 50 and 60. Jack 45 could be a mere jumper across $R_9$, but it is more convenient to provide it for the purpose of plugging in a low resistance test instrument such as milliammeter for checking performance in the meter circuit without disturbing operation of the complete system, or any part thereof, in fully plugged-in condition. If jack 45 is unshorted by plugging a milliammeter therein, the milliammeter is practically a short itself and hence will not disturb the current flow in any circuit wherein the jack 45 normally acts as a connector.

The extreme settings of switches S–1, S–2, S–3 and S–4, unlock and balance, are essentially automatic and manual settings, respectively. As to unlock, since it is convenient to provide S–1, S–2, S–3 and S–4 as four identical rotary switches gauged so that the four switch taps move as one, when a common operating knob or the like is turned, it is also convenient to duplicate the automatic contacts and connections of the switches taps and define and "unlock" setting in which the mechanical operation of switching from automatic to unlock releases a catch, or the like, which in the automatic setting of the switches, prevents removal of unit 61.

As to balance, one use of jack 45 is to meter the output of amplifier O when the error signal into the controller is shorted out, in order to check on whether or not the amplifier is correctly adjusted or balanced, i.e., for proper control action there is a predetermined controller output corresponding to zero error signal. Hence, the manual contacts and connections of switches S–1, S–2, S–3 and S–4 are duplicated in effect by replacing the meter and jack circuit with a direct connection between tap 24 of manual supply 66 and terminal 54 via switch S–1, shorting terminal A to circuit common via switch S–4 and connecting meter M between terminal X and circuit common via switch S–2, jack 45, switch S–3, $R_5$ and $R_6$.

Therefore, if switches S–1, S–2, S–3 and S–4 are set to balance position, either meter M, or a separate test milliammeter (as when the controller combination is panel mounted, see FIGURE 3) plugged into jack 45 will show whether or not the amplifier O is balanced.

It was remarked in connection with FIGURE 1 that resistance $R_1$ should be disconnected in manual, and in FIGURE 2 it will be seen that switch S–4 provides for connection of $R_1$ to terminal A while the control system is in the automatic, test and unlock states. Likewise, if the manual unit 61 is removed during automatic control, push button 73 then connects $R_1$ to terminal of amplifier O. On the other hand, switch S–4 breaks the connection of $R_1$ to terminal in manual and balance and, in these states, respectively provides for connecting terminal A to the junction of $R_7$ and $R_{8a}$, and for shorting terminal A to circuit common.

FIGURE 4 fragmentarily illustrates a typical arrangement for actuating push button switches 57, 58, 59 and 73 upon disconnection and connection of controller sections. A spring arm 75 is mounted cantilever fashion, as indicated in the figure, on section 40a. On the other hand, a push button switch, which may be switch 59 in this illustration, is mounted on center section 50a. Switch 59 has a push button 76, reciprocable in and out of the body of the switch, and is biased outwardly of the switch (by spring means, or the like, not shown). Switch 59 also has a pair of terminals 77 and 78 each leading to one of a pair contacts (not shown) in the body of the switch. As will be understood by those skilled in the art, one of said contacts either actually or in effect, will be movable with push button 76. In this case, when push button 76 is in its outward position the said movable contact will be in contact with the other said contact, and electrically connect terminal 77 to terminal 78, whereas if the push button 76 is pushed in, the said movable contact will move out of contact with the said other contact, thus disconnecting terminals 77 and 78.

Accordingly, either or both of lever 75 and switch 59 will be located so that if section housings 40a and 50a are brought together to interfit the various plug and socket connections of sections 40 and 60, the free end of arm 75 will contact push button 76 before the two section housings come together as closely as they are designed to. Accordingly, when section housings 40a and 50a are completely brought together with said plugs and sockets interfitted, arm 75 will be maintaining push button 76 depressed into the body of switch 59, so that the said contacts are now separate and no connection exists between terminals 77 and 78. In the case of switch 59, the said terminals represent either the sockets of section 50 involved in the connection of $C_1$ and $R_1$ with terminal A, etc., or a pair of terminals connected to such sockets.

Obviously, if section housings 40a and 50a are separated, arm 75 releases push button 76, the push button returns of itself to its outermost position relative to the switch casing and, accordingly, the aforesaid contacts in the body of the switch touch each other and connect terminals 77 and 78.

As will be evident herein, and from the aforesaid Nichols application, operation of the disclosed controller and its adjuncts is not exclusively on either a current or voltage basis. For example, the final control element is current-operated from the output of amplifier O, whereas the amplifier O operates on a voltage-summing basis at its input.

However, as will be understood by those skilled in the art, this need not necessarily be the case. In this instance, the voltage-summing input to amplifier O lends itself to use with vacuum-tube type amplifiers. However, transistor-type amplifiers, which are more conveniently utilized on the basis of current input, might be used in the practice of our invention, and would involve certain characteristics peculiar to current-operation.

For example, since current sources function more or less independently of the load resistance placed thereon, comparison of manual current and dummy load currents, as such, would be possible (in manual), and hence would obviate the need for dummy load resistance being equal or nearly equal to the resistance of $Z_L$ and $R_3$.

In view of the foregoing, we intend that no claim infra be construed as limiting our invention as to voltage and/or current considerations, save in respect of that of which the language of such claim may necessarily require such limitation.

The foregoing is a full description of our invention in such detail as would enable one skilled in the art to make and use it in the best form thereof thus far known to us. However, our detailed specification is intended to be illustrattive rather than restrictive of the claims, since those skilled in the art will be aware of many variations, especially as to switching engagements, that do not escape the principles of the invention. For example, the automatic-manual transfer scheme does not depend in its essence on switches S–1, S–2, S–3 and S–4 having five positions, since as is obvious, unlock and balance positions can simply be eliminated; likewise, for the test position, if two meters M are provided, one for the automatic load circuit and one for the manual circuit.

We claim:
1. A high-gain amplifier having an output at which appears a first output signal and having an input at which an input signal is applied, and having a signal connection between said output and said input, said amplifier being constructed and arranged so that said first output signal is a function of said input signal, and so that said first output signal is fed back via said signal connection to said input, thereby preventing said input signal from departing substantially from a given level and causing said first output signal to be related to said input signal; first load means adapted to be connected to said output for utilization of said first output signal, second load means adapted to be connected to said output for utilization of said first output signal; adjustable means for producing a second output signal of the same nature as said first output signal, said adjustable means being constructed and arranged to produce said second output signal at the same time said first output signal is being produced, and being adjustable to produce said second output signal at the same level and sense as the said first output signal, switching means operable to a first condition wherein said first load means is connected to said output to utilize said first output signal, said switching means also being operable to a second condition wherein said second load means is connected to said output so as to utilize said first output signal and wherein said first load means is connected to said adjustable means so as to utilize said second output signal; comparison means having first and second inputs and a comparison-signal output; said comparison means being constructed and arranged such that if a first signal is applied to said first input and a second signal is applied to said second input, a comparison signal will appear at said comparison signal output corresponding to the degree of unlikeness in level of said first and second signals, the arrangement being that if said switching means is in said second condition, said first input is connected to said first load means to derive therefrom such first signal in correspondence with the level of the output signal applied to said first load means, said second input is connected to said second load means to derive said second signal therefrom in correspondence with the level of the output signal applied to said second load means, and said comparison-signal output is connected to said input of said high gain amplifier to apply such comparison signal thereto in opposition to the output signal fed back to said input of said high gain amplifier via said signal connection, whereby when said switching means is in said second condition said amplifier will maintain said first output signal at a level identical to the level of said second output signal.

2. A controller including a D.C. amplifier having an input terminal and an output terminal, an input circuit connected to said input terminal for applying a D.C. input voltage to said input terminal, a feedback circuit responsive to an output signal at said output terminal to derive a feedback voltage opposed in sense to said D.C. input voltage, said feedback circuit being connected to said input terminal so as to apply said feedback voltage to said input terminal, said input circuit being supplied with an error signal corresponding to the difference between the desired value of a process variable and the actual value thereof, said input circuit being responsive to said error signal to cause said D.C. input voltage to correspond to said error signal, whereby an output signal corresponding to said error signal is produced at said output terminal, and one of said circuits including capacitance arranged so as to tend to charge up to potentials determined by the said D.C. voltages, the arrangement being that said feedback voltage tends to maintain said input signal at zero potential with reference to a point of potential common to said terminals and in spite of changes in said error signal; a useful load circuit including a control device adapted to load said amplifier and to vary said process variable in accordance with said output signal if the said output signal is applied to said useful load circuit; a dummy load circuit adapted to load said amplifier but without affecting said process variable, if said output signal is applied to said dummy load circuit; a source of adjustable output signal for applying an output signal to said useful load circuit with the same results as in the case of said output signal of said amplifier, save that said adjustable output signal is adjustable independently of said error signal and is constructed and arranged to produce said adjustable output signal at the same time as said error signal is being supplied to said input circuit; switching means operable to a first position so as to apply said output signal of said amplifier to said useful load circuit, and, alternately and at will, to a second position so as to apply said output signal of said amplifier to said dummy load circuit instead of to said useful load circuit and to apply said adjustable output signal of said source to said useful load circuit; whereby it is possible to vary said process variable either as a function of said error signal or as function of the state of adjustment of said adjustable output signal of said source; circuit means connectible to each of said circuits for deriving voltages therefrom proportional to the output signal therein, said circuit means being responsive to the last said voltages to produce a D.C. voltage opposed in sense to said D.C. input voltage, if there is a difference between said output signals, and also proportional to the difference, if any, between output signal applied to said useful load circuit by said source and output signal applied to said dummy load circuit by said amplifier; and said switching means, when in said second position, connecting said circuit means as aforesaid, and applying the last said D.C. voltage to said input terminal.

3. An amplifier having a voltage input and an output; an input circuit connected to said voltage input, said input circuit being constructed and arranged to receive an error signal and induce corresponding voltage changes at said voltage input, said amplifier being responsive to said voltage changes to produce an output signal at said output, a feedback circuit connecting said output to said voltage input, there being capacitance associated with said circuits, said capacitance being responsive to an output signal from said output to induce a voltage at said voltage input opposing changes in voltage induced at said voltage input by said error signal, switching means operable to a first position and a second position, said output being connected in said first position to a real control device to supply said output signal to said real control device for operating said real control device; said switching means in its second position disconnecting said output from said real control device and connecting said real control device to a source of output signal independent of said error signal and existing simultaneously therewith; said switching means in its second position also connecting a dummy control device to said output of said amplifier to receive said output signal of said amplifier; circuit means operative to differentially compare said output signals when said switching means is in said second position and to produce a voltage in accordance with the results of differential comparison of said output signals, said switching means in its second position connecting said circuit means to said voltage input for applying the last said voltage to said voltage input to cause said amplifier to maintain an output signal in said dummy control device that is equal to the output signal provided for said real control device by the said source of signal output, and to maintain the charge on said capacitance at the proper value, whereby said switching means can be switched to said first position from said second position to interchange said real control device and said dummy control device without disturbing the operation of the former.

4. The invention of claim 3 wherein said switching means is operable to third position wherein said dummy control device is connected to said source of output signal, and wherein said real control device is connected to the output of said amplifier as in the said first position, said source being adjustable as to its signal output to permit application to said dummy control device of source output signal of the same value as amplifier output signal to said rear control device while said switching means is in said third position, whereby said switching means can be operated from said first to said third to said second position consecutively and in that order, and as well, from said second directly to said first or to said third position while avoiding change in value of output signal to said real control device when operation of said switching means causes said real control device to receive output signal from said source instead of said amplifier, and vice versa; there being metering means, said metering means being connectible to either of said output signals so as to be responsive to indicate the value of the output signal to which it is connected, said switching means in its first position connecting said metering means to said amplifier output signal, and in its third position connecting said metering means to said source output signal.

5. In combination, an amplifier and a first resistance, said amplifier and said first resistance being arranged to be connected to a load so that said amplifier drives a load current through said first resistance and said load in series; a current-supplying means connectible to said first resistance and said load for driving a load current through said first resistance and said load in series; switching means operable, alternately and at will, to connect said load and said first resistance either with said amplifier or with said current-supplying means; a second resistance equal to said first resistance; said first resistance being disconnectible from said load independently of said switching means, and means actuated upon disconnection of said first resistance from said load to connect said second resistance to said load in place of said first resistance, whereby said first resistance may be disconnected from said load while said current-cupplying means is connected to said first resistance and said load, as aforesaid, without changing the current through said load.

6. The invention of claim 5, wherein the said means actuated upon disconnection of said first resistance includes a shorting device normally bridged across said second resistance, said second resistance and said shorting device forming part of the current path through said load and said first resistance when said current-supplying means is driving current through said load, said shorting device being disconnected from said current path in response to disconnecting said first resistance from said load, and said means actuated upon disconnection of said first resistance includes switch means responsive to removal of said first resistance to effectively connect said second resistance to said load.

7. In combination, a controller having an output terminal for connecting to a load to be driven by said controller in response to a control signal generated at said output terminal by said controller, a control signal source also having an output terminal for connection to said load so as to drive said load with a control signal general by said control signal source at the second said output terminal; a meter circuit; switching means constructed and arranged to connect, alternately and at will, said load and either of said output terminals in a control signal path including said meter circuit; said meter circuit and said switching means being disconnectible from said control signal path; means actuated upon disconnection of said meter circuit and said switching means, when said switching means has connected said load and the first said output terminal in said control signal path, to complete said control signal path where said path is interrupted by disconnection of said meter circuit from said control signal path.

8. A controller including a signal amplifier having an error signal input and control signal output, means connected to said error signal input for providing an error signal thereat that is representative of deviation of a process signal from a predetermined control point, said amplifier also having output to input feedback for maintaining substantially zero error signal at said input while said amplifier produces a control signal at said output in response to and in correspondence with error signal provided at said input by said means; further control signal producing means having a further control signal output and being adapted to adjustably produce a further control signal at the last said output like the first said control signal at the first said output and simultaneously therewith, said further control signal producing means being independent of the first said means; switching means operable for alternately and at will connecting a load to either of said outputs to receive control signal produced at such output, and comparison means responsive to difference between said control signals for producing a comparison signal, said comparison means being so constructed and arranged that said comparison signal is substantially identical to an error signal of such nature as to be able to cause said amplifier to produce an output signal equal to said difference, but opposite in sense; said switching means being operable to connect said comparison signal to said error signal input while said further control signal producing means is connected to said load, and said load being so constructed and arranged as to tend to cause deviation of said process signal to disappear in response to a control signal produced by said amplifier in response to an error signal representing said deviation, when said switching means connects said amplifier to said load such that said amplifier provides control signal for said load.

References Cited in the file of this patent

UNITED STATES PATENTS

| | | |
|---|---|---|
| 2,679,022 | McIlhenny | May 18, 1954 |
| 2,762,938 | Newbold | Sept. 11, 1956 |
| 2,773,944 | Karlson | Dec. 11, 1956 |